United States Patent
Hoffmann

(10) Patent No.: US 9,625,000 B2
(45) Date of Patent: Apr. 18, 2017

(54) SPRING-DAMPER SYSTEM FOR USE IN BEARINGS OR AS A DAMPER

(71) Applicant: MAN Truck & Bus AG, Munich (DE)

(72) Inventor: Joerg Hoffmann, Nuremberg (DE)

(73) Assignee: MAN TRUCK & BUS AG, Munich (DE)

(*) Notice: Subject to any disclaimer, the term of this patent is extended or adjusted under 35 U.S.C. 154(b) by 210 days.

(21) Appl. No.: 14/497,958

(22) Filed: Sep. 26, 2014

(65) Prior Publication Data
US 2015/0091228 A1    Apr. 2, 2015

(30) Foreign Application Priority Data
Sep. 27, 2013   (DE) .................. 10 2013 016 078

(51) Int. Cl.
| F16F 15/02 | (2006.01) |
| F16F 13/00 | (2006.01) |
| F16F 13/26 | (2006.01) |

(52) U.S. Cl.
CPC ............ *F16F 15/022* (2013.01); *F16F 13/00* (2013.01); *F16F 13/26* (2013.01); *F16F 15/02* (2013.01); *F16F 2230/08* (2013.01)

(58) Field of Classification Search
CPC .......... F16F 15/02; F16F 15/022; F16F 13/00; F16F 13/26; F16F 2230/08
See application file for complete search history.

(56) References Cited

U.S. PATENT DOCUMENTS

| 7,822,522 | B2* | 10/2010 | Wereley | B60N 2/4242 |
| | | | | 188/267.1 |
| 2003/0160369 | A1* | 8/2003 | LaPlante | B60G 17/08 |
| | | | | 267/136 |
| 2009/0212473 | A1* | 8/2009 | Matsuzaki | B60G 11/26 |
| | | | | 267/64.22 |
| 2010/0198457 | A1* | 8/2010 | Hermann | B60K 5/1283 |
| | | | | 701/36 |
| 2011/0035118 | A1* | 2/2011 | Hiemenz | B60N 2/4242 |
| | | | | 701/45 |

* cited by examiner

*Primary Examiner* — Vishal Sahni
(74) *Attorney, Agent, or Firm* — Lucas & Mercanti, LLP

(57) ABSTRACT

A spring-damper system for use in bearings or as a damper, in particular as a spring-damper system in active engine bearings includes a coupling device which can be coupled to a load and to a supporting device at a bearing or damping point, in order to mount the load in such a way that it can vibrate on the supporting device. The coupling device is designed to transmit a load input generated by the load substantially without loss to a spring-damper device and to absorb a reaction thereto by the spring-damper device and to feed said reaction back to the load, in order to counteract the load input in a vibration-damping fashion. In this context, the spring-damper device can be arranged and/or is arranged spatially separate from the bearing or damping point.

20 Claims, 6 Drawing Sheets

SPRING-DAMPER SYSTEM FOR USE IN BEARINGS OR AS A DAMPER

CROSS-REFERENCE TO RELATED APPLICATIONS

This application claims the priority of DE 10 2013 016 078.2 filed Sep. 27, 2013, which is incorporated by reference herein.

BACKGROUND OF THE INVENTION

The invention relates to a spring-damper system for use in bearings or as a damper, in particular an active spring-damper system for active bearing systems. The invention also relates to a vibration-damping bearing, in particular an active bearing.

In virtually all technical fields, vibration problems occur which have to be solved, for example by decoupling part of a structure from its vibrating surroundings. An example of this is the bearing system of drive assemblies in vehicles, which constitutes a transmission point for vibrations and solid-borne sound. In order to prevent disruptive vibrations and noises propagating, devices for vibration damping or isolation, which are of different designs, are know from the prior art, said devices using elastic and/or damping materials to generate a purely passive vibration effect. These prior art devices are not able to adapt to changing system properties in order to maintain the best possible vibration damping or isolation.

In addition to vibration-damping or isolating systems which are of purely passive design, use is being increasingly made of mechatronic and adaptronic solutions in order to implement active bearings. Although active bearings are technically more complex than passive bearing systems, they provide the possibility of a broadband reduction in vibrations and selective influencing of the transmission behaviour, for example through selective inputting of counteracting vibrations or selective changes in the damping or vibration properties of the system. Such active bearings, in particular for engine bearing systems, are known, for example, from DE 10 2005 029 234 A1 and from MTZ—Motortechnische Zeitschrift [Engine Technology Periodical], Issue January 2013, 74th Year, pp 55-59. In this context, the active bearing or the active spring-damper system is respectively arranged between the engine and the engine frame.

The disadvantage of such spring-damper systems or bearing systems is the comparatively large installation space which is necessary for the use of these systems. For this reason, when a small installation space is available, such as, for example in the case of engine bearings, the use of active bearings is often dispensed with or they are not provided at all the bearing points or not in all the spatial directions. An approach, that when the spatial conditions are limited, the actuator system for the active spring-damper system is to be made correspondingly smaller, is, however, generally associated with disadvantageous limitations regarding the available maximum force and the maximum displacement and/or robustness or durability.

SUMMARY OF THE INVENTION

An object of the invention is to make available a spring-damper system for use in bearings or as a damper, in particular for engine bearings, which avoids the disadvantages of conventional spring-damper systems. The spring-damper system is to be capable of being arranged, in particular even in the case of restricted spatial conditions, between a load which is to be supported and a supporting device for absorbing the load, without having to accept disadvantages with respect to the damping and spring properties. A further object of the invention is to make available a bearing, in particular an active bearing, which avoids disadvantages of conventional bearings.

The invention comprises the general technical teaching of arranging the spring-damper mechanism of a spring-damper system and, in the case of an active spring-damper system, the actuator system and the sensor system of the spring-damper mechanism spatially separate from the actual bearing point and of transmitting the load input occurring at the bearing point, in particular the bearing force and the bearing displacement, to the spring-damper mechanism and transmitting or feeding back the reaction thereof to the bearing point.

According to the invention, for this purpose a spring-damper system for use in bearings or as a damper is proposed, said spring-damper system comprising a coupling device which can be coupled to a load and a supporting device at a bearing or damping point in order to support the load on the supporting device in such a way that it can vibrate.

According to one exemplary embodiment on which emphasis is placed and to which reference is made repeatedly below, the load is, for example, an engine of a motor vehicle and the supporting device is the frame on which the motor is supported. However, the spring-damper system according to the invention is not limited to the use for the engine bearings, as will be explained in even more detail below.

The coupling device is designed to transmit a load input, generated by the load, substantially without loss to a spring-damper device. The coupling device is further designed to absorb a correspondingly spring-loaded and/or damping reaction of the spring-damper device to the load input of the spring-damper device and to feed said reaction back to the load in order to counteract the load input in a vibration-damping fashion.

The spring-damper device forms here the spring-damper mechanism of the spring-damper system and has spring-loaded and damping properties. The spring-damper device can also be arranged and/or is also arranged spatially separate from the bearing or damping point.

The coupling device therefore serves as a transmission mechanism in order to transmit the load input at the bearing point to the spaced-apart spring-damper device with as little loss as possible, and is operatively connected thereto in a bi-directional manner.

According to one embodiment, the coupling device transmits the load input substantially without loss to the spring-damper device, which means that the coupling device itself does not have any substantial damping properties, at least in a certain frequency range (for example 0-100 Hz). In other words, the coupling device is embodied in such a way that, apart from the friction losses, which can never be entirely avoided for structural reasons, it does not have any damping property, at least in a certain frequency range.

The arrangement of the spring-damper device spatially separate from the bearing or damping point means, for example, that the latter can be arranged outside an intermediate space which is formed between the load and the supporting device, i.e. outside the vibrating region.

The present invention therefore permits the generation of the load input or the bearing point to be spatially separated from the spring-damper mechanism. As a result, the spring-damper system can be arranged with sufficient installation space at a suitable point and is not restricted in its structural configuration by the frequently limited installation space between the load and the supporting device.

According to one particularly preferred embodiment the spring-damper device is embodied as a sensor actuator unit and is configured to detect the transmitted load input and to counteract the transmitted load input by actuator means. A particular advantage of this embodiment of the invention is therefore that an active spring-damper system can be made available for use in active bearings, in which system the structural configuration, in particular the dimensions of the sensor actuator unit, are not restricted by a limited installation space at the bearing point.

At the bearing point itself only a transmission mechanism for the load input is arranged, said transmission mechanism passing on the load input to the remotely arranged spring-damper device or the sensor actuator unit. As a result, the space which is required at the bearing point is considerably reduced, as a result of which the active spring-damper system according to the invention can be used as an active bearing for bearing points, where previously the use of a high-power active bearing was not possible.

A further advantage is that the moved mass at the bearing point itself can be kept small. In addition it is possible to provide relatively large spring-damper elements or relatively large actuators which can be implemented in a more robust and cost-effective form with better performance. A particular advantage is also that the sensor actuator system and sensor system can be protected better against environmental influences and other destructive influences which otherwise occur at the bearing point. By embodying the spring-damper device as a sensor actuator unit, a dynamic-adaptive spring-damper system is therefore made available whose spring and damping properties can be changed statically and/or dynamically, and which can be used in a very flexible way by virtue of the possibility of arranging the sensor actuator unit spatially separate from the bearing point.

The spring-damper device which is embodied as a sensor actuator unit preferably comprises a first sensor which is designed to determine a first control variable which is dependent on a bearing force of the load input. The spring-damper device also preferably comprises a second sensor which is designed to determine a second control variable which is dependent on a bearing displacement of the load input. As a function of the determined first control variable and/or second control variable, the spring-damper device is designed to change the damping properties and/or the spring properties of the spring-damper device and/or to actively generate an opposing force to the transmitted load input. The control variables which are detected by a sensor and are dependent on the load input are therefore used to control the spring-damper device by actuator means.

According to one preferred embodiment, the coupling device comprises a first fluidic lifting cylinder which is arranged at the bearing or damping point, and a second fluidic lifting cylinder which is arranged on the spring-damper device, wherein the two fluidic lifting cylinders are movably coupled via a first fluid line. The second lifting cylinder which is arranged on the spring-damper system, is also fluidically coupled to the spring-damper system and operatively connected thereto.

In one advantageous variant of this embodiment, the fluidic lifting cylinders are embodied as hydraulic cylinders and contain an incompressible fluid of low viscosity, with the result that damping losses not generated during the absorption and transmission of the load input to the spring-damper device.

However, it is also possible to embody the two lifting cylinders and the fluid line pneumatically.

According to these variants, the first sensor is embodied as a pressure sensor, and the spring-damper device is configured to determine, as a first control variable, a fluid pressure p in the second lifting cylinder, wherein the fluid pressure p which is measured in the second lifting cylinder is dependent on the transmitted bearing force F which is applied to the first lifting cylinder by the load at the bearing point.

In addition, the second sensor can detect, as a second control variable, a spring travel s of the spring-damper device, wherein the spring travel s is dependent on a load displacement which occurs at the bearing point.

According to a further embodiment, a fluid reservoir is provided which can be connected to a fluid circuit, formed by the first and second lifting cylinders and the first fluid line, for varying the fluid volume in the fluid circuit. As a result, ride level control of the spring-damper system is made possible without changing the dynamic properties of the spring-damper system. When the spring-damper system is used as a bearing, the setpoint height of the load to be supported can therefore be set or adjusted to a desired level.

According to a further variant, in addition to the first fluid line described above a second fluid line is provided via which the first and second lifting cylinders are also movably coupled, wherein the first fluid line and the second fluid line respectively open into the lifting cylinders on opposite sides of the reciprocating piston of the lifting cylinders. This embodiment improves the transmission behaviour of the coupling device since as a result transmission of the load input is made possible exclusively by pressure acting on the fluid, as a result of which relatively large forces or accelerations can be transmitted.

In addition, this embodiment variant avoids the fact that in the case of a rapid piston movement an abrupt drop in pressure can occur as a result of which hydraulic oil is damped and as a result an undesired change in volume occurs. This effect can occur in the embodiment variant with just one fluid line, where oil is respectively located on just one side of the piston. By providing the fluid on both sides of the piston and by transmitting the load input through two fluid lines, respectively opening into the lifting cylinders at opposite end regions of the piston, the piston movement can therefore be transmitted more directly and reliably.

Furthermore it is advantageous to prestress the first and/or the second lifting cylinders. This may be done, for example, with a customary spring element which prestresses the piston of the lifting cylinder in a home position, in order to set a desired position of rest. A further advantage of this arrangement is that by making available a safety mechanism, it is possible to avoid uncontrolled dying away of the power of the engine in the event of a leak in the fluid line.

A particular advantage of the invention is also that the spatially separated arranged spring-damper device and the coupling device can be coupled to the load and to the supporting device at a plurality of bearing or damping points. In other words, it is therefore possible to support a load at a plurality of bearing points in a vibration-damping fashion with just one spring-damper device, as a result of which space-saving and cost-effective bearing is made possible.

According to one advantageous variant of this embodiment, the coupling device comprises for this purpose a plurality of first lifting cylinders which can each be coupled to the load and to the supporting device at various bearing or damping points. In this context, each of these first lifting cylinders, which are respectively arranged at a bearing point, is fluidically coupled via a fluid line to the same second lifting cylinder which is arranged at the spring-damper device. In the case of n bearing points or n first lifting cylinders there is therefore a 1:n relationship between the second lifting cylinder or the spring-damper system and the n first lifting cylinders which are arranged at the n bearing points.

In this context it is possible to fluidically couple the plurality of first lifting cylinders in a movable fashion to the second lifting cylinder in a parallel connection. In this context, a constant ratio of the bearing forces $F_1/F_2/\ldots/F_n = A_1/A_2/\ldots/A_n$ is made possible, wherein A is the piston face of the lifting cylinder i facing the fluid at the bearing point i, and $F_i$ is the bearing force at the bearing point i. As a result, the bearing forces can be minimized, the application of force, for example into the vehicle frame, can be optimized, and optimum weight distribution can be achieved.

However, according to a further embodiment variant it is also possible to fluidically couple the plurality of first lifting cylinders in a movable fashion to the second lifting cylinder in a series connection. This embodiment can be used, for example, for rolling stabilization since the ratio of the bearing displacements $z_1*A_1 = z_2*A_2 = \ldots = z_n*A_n$ is constant, wherein $A_i$ is in turn the piston face of the lifting cylinder i facing the fluid at the bearing point i, and $z_i$ is the bearing displacement at the bearing point i.

One advantageous embodiment of this variant also provides for a separate fluid reservoir to be provided at each of the n first lifting cylinders, with the result that automatic ride level control is made possible at any bearing point. This permits a bearing with a parallel orientation of the loading face with respect to the support unit even in the case of unequal load distribution on a supported loading face by virtue of the fact that the unequal load distribution is compensated for by selective level adaptation of the fluid volume at the individual bearing points.

It is emphasized that a spring-damper device is generally to be understood in the sense of this invention as meaning a device which has spring-loaded and damping properties. It is also emphasized that a spring property and a damping property of the spring-damper device can each be made available by separate components or by just one component. Therefore, for example elastomers or rubbers have both elastic properties, i.e. spring properties, as well as damping properties and can be embodied as single-part spring-damper elements. Alternatively, the spring-damper device can contain a first component which predominantly makes available the damping properties of the system, and a second component which predominantly makes available the spring-loaded properties of the system.

In one refinement of the spring-damper system as a sensor actuator unit, the damping element and/or the spring element are dynamically adjustable. The damping element can be embodied, for example, as a damping element which operates in an electrorheological or magnetorheological fashion. In addition, the spring element can be provided with a dynamically adjustable hardness, for example in the form of a mechanical spring with variable prestress or in the form of a gas spring with a variable volume or filling quantity.

The embodiment of the spring-damper device is however not limited to the examples above. A spring-damper device in the sense of this invention should generally include mechanical and mechatronic systems for implementing a force/travel characteristic curve which are designed to generate a force/travel reaction which can be fed back to the bearing point via the coupling device. Further embodiments of the spring-damper device can therefore be implemented, for example, by means of a moving coil, a lifting magnet and/or piezo-actuators which are correspondingly controlled by actuator means in order to make available the desired spring or damping properties. Likewise, it is possible to generate the desired spring properties or damping properties by means of suitable actuation, for example of a linear motor. The spring-damper device can therefore be embodied as a linear motor.

In addition, the coupling device is not limited to the above-mentioned exemplary embodiments based on the use of fluidically coupled lifting cylinders but instead can also be implemented via other suitable transmission mechanisms which are loss-free or low in loss, at least in a certain frequency range, for example by means of a mechanical lever mechanism.

As mentioned above, the use of the above-mentioned spring-damper system in motor bearings is particularly advantageous, with the result that the supporting device is an engine frame, and the load is an engine. Likewise, the use of the spring-damper system for supporting a chassis is possible, wherein the supporting device is a vehicle body and the load is a chassis. A further application possibility relates to the supporting of loading faces, driver's cabs or other vehicle components which are to be decoupled from the rest of the vehicle. The spring-damper system according to the invention can also be used as a shock absorber, for example for vehicle seats, wherein the supporting device is a supporting structure for a vehicle seat. The present invention is, however, not limited to these applications but instead can in principle be used for various bearing systems, in particular in the case of machines or assembly devices or transportation devices.

The invention also relates to an active vibration-damping bearing a spring-damper system according to one of the aspects described above, in particular an engine bearing, a chassis bearing or a machine bearing.

BRIEF DESCRIPTION OF THE DRAWINGS

Further details and advantages of the invention are described below with reference to the appended drawings, in which.

DETAILED DESCRIPTION OF THE PREFERRED EMBODIMENTS

Figure 1:
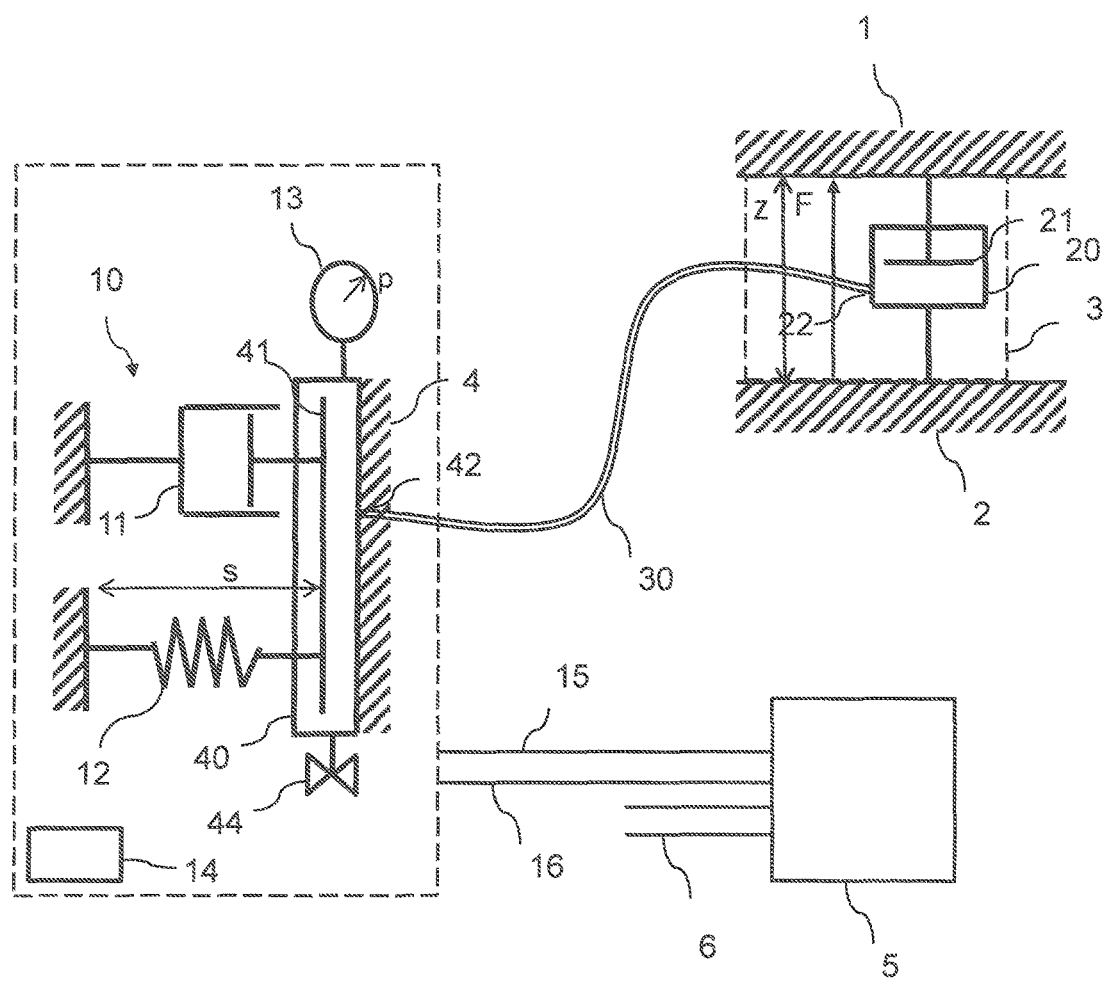
FIG. 1 shows a schematic illustration of an engine bearing according to an exemplary embodiment.

FIG. 1 shows a first exemplary embodiment of a spring-damper system for use as a vibration-damping engine bearing. In this context, a load in the form of a motor vehicle engine 1 is supported on a supporting device in the form of an engine frame 2 via a hydraulic lifting cylinder 20 and is mounted so as to be capable of vibrating in the longitudinal direction of the lifting cylinder 20. The hydraulic cylinder 20 is arranged here in the critical installation space between a load, for example an engine 1, and a supporting structure which is rigid with respect to vibration, for example a frame 2, and is movably coupled both to the engine 1 and to the frame 2 in order to support the engine on the frame 2 in such a way that it can vibrate.

Although the load and supporting device are described as an engine bearing, the supporting device may also be a vehicle body with the load being the chassis, or the supporting device may be a supporting structure for a vehicle seat as the load. In general, the supporting device is rigid with respect to vibration, and the load is a machine, assembly device, or transportation device.

The bearing point 3 which is formed by the first hydraulic cylinder 20 is characterized by the dashed line in FIG. 1. The bearing which is formed by the hydraulic cylinder 20 is subjected to a bearing force F between the load 1 and the frame 2 and to a bearing displacement z resulting therefrom, which load and frame are illustrated schematically in FIG. 1 by the arrows characterized by z and F respectively.

In the hydraulic cylinder 20 there is an incompressible fluid of low viscosity, for example a thin hydraulic oil, in the internal volume which is bounded by the cylinder piston 21 and the lower end of the hydraulic cylinder 20. A hydraulic line 30 opens into the lower end region 22 of the hydraulic cylinder 20. A bearing displacement z as a result of a movement of the engine 1 towards the frame 2 brings about a downward movement of the piston 21 of the first hydraulic cylinder 20 and brings about corresponding expulsion of the fluid from the cylinder, said fluid flowing out via the hydraulic line 30. Correspondingly, a movement of the engine 1 away from the frame 2 brings about an upward movement of the piston 21 of the first hydraulic cylinder 20 and a corresponding inflow of the fluid into the cylinder 20.

The first hydraulic cylinder 20 is fluidically coupled to a second hydraulic cylinder 40 via the hydraulic line 30 wherein the fluid line 30 opens into an end region 42 of the second hydraulic cylinder. A movement of the piston 21 of the first hydraulic cylinder 20, which brings about a reduction in the fluid volume in the first lifting cylinder 20, brings about a corresponding increase in the fluid in the second fluid cylinder 40 and a corresponding movement of the lifting piston 41 of the second hydraulic cylinder 40 there.

In this context, in the present exemplary embodiment the through-opening 22 constitutes the only fluid opening via which the fluid can escape from the first hydraulic cylinder 20. In particular, the pressure face of the piston 21 does not have a through-opening as is otherwise customary in the case of hydraulic pistons with damping properties. The same applies to the through-opening 42 and the piston 41 of the second hydraulic cylinder 40.

The fluidic coupling of the two hydraulic cylinders 20 and 40 therefore causes a movement of the piston 21 in the first hydraulic cylinder 20 to bring about a corresponding movement of the piston 41 of the second lifting cylinder 40, and vice versa, with the result that the load input is transmitted substantially free of loss from the first hydraulic cylinder 20 to the second hydraulic cylinder 40, and vice versa. The fluid line 30 which connects the two hydraulic cylinders 20, 40 is dimensioned here in terms of its length in such a way that the second hydraulic cylinder 40 can be arranged spatially separate from the bearing point 3, i.e. outside the intermediate space between the engine 1 and the frame 2. For example, the second hydraulic cylinder 40 can be arranged on a spaced-apart supporting unit 4 such as, for example, a vehicle body or a loading face or below the vehicle frame, where the mass of the parts which are to be arranged and the space required are less restricted.

The second lifting cylinder 40 is arranged on a spring-damper device 10 and coupled thereto, with the result that the second lifting cylinder 40 and the spring-damper device 10 are operatively connected. The spring-damper device 10 is composed of a damping element 11 and a spring-loaded element 12. It is emphasized that the illustration in FIG. 1 is a schematic circuit diagram of a spring-damper device 10 and not a structural illustration. The damping element 11 and spring-loaded element 12 may be combined in one component, such as a linear motor connected to an actuator in the form of a control device 5 (described in more detail below) or as separate components.

The movement equations of vibration-damped physical systems can therefore be described by the differential vibration equation:

$$m\ddot{x} + d\dot{x} + kx = 0$$

where m is the mass, d is the damping constant and k is the spring constant of the system. For visco-elastic materials or components, these vibration-damping properties are also described with the Kelvin-Voigt model. Vibration-damped systems comprise a damping element, illustrated schematically by the reference symbol 11 in FIG. 1, the damping property of which is described by the damping constant d and on which the speed $\dot{x}$ of the vibration depends. In addition vibration-damped systems comprise a spring-loaded element, illustrated schematically by the reference symbol 12 in FIG. 1, the spring-loaded property of which is described by the spring constant k, and which depends on the magnitude of the deflection x of the system vibration.

As is described above, a spring-damper device 10 can be selected in which the damping property 11 and the spring-loaded property 12 are implemented in one component, for example by a suitable elastomer or alternatively by two separate components, wherein one component is substantially responsible for the damping properties and the other component for the spring-loaded properties of the spring-damper device 10. For example, a lifting cylinder with a through-opening can be provided as a damper in the piston, with the result that damping is brought about by means of a friction-loaded overflow of a fluid from one side of the piston to the other. The damper 11 can be adjusted dynamically in the present exemplary embodiment, and is, for example, a damper which operates in an electrorheological fashion. In addition, the spring element 12 is embodied as a spring with an adjustable hardness. This can be implemented, for example by means of a mechanical spring with a variable prestress or by means of a gas spring with a variable volume or filling quantity.

If the movement of the piston 21 of the first hydraulic cylinder 20 is then transmitted to the piston 41 of the second hydraulic cylinder 40, the piston 41 of the second hydraulic cylinder 40 couples the movement to the spring-damper device 10. In response to this, a corresponding opposing reaction of the spring-damper device 10 is generated, which reaction is in turn transmitted to the piston 41 of the second lifting cylinder and subsequently fed back to the first hydraulic cylinder 20 via the fluid line 30. As a result, the movement of the first hydraulic cylinder 20 is vibration-damped and consequently a vibration-damped bearing of the engine 1 on the frame 2 is made available.

The spring-damper device 10 is embodied as a sensor actuator unit in order to detect the transmitted load input by sensor and to counteract the transmitted load input by actuator means. In this context, a pressure sensor 13 is provided which detects the fluid pressure p in the second hydraulic cylinder 40. On the basis of the measured fluid pressure p it is possible to infer the bearing force F acting at the bearing point, since the generated fluid pressure p depends on the bearing force (F=f(p)). As a result, the bearing force can be detected by sensor via the pressure sensor 13. In addition, the spring-damper device 10 is designed to detect a spring travel s of the spring element 12. The spring travel s depends, in turn, on the bearing displacement z which occurs at the bearing point 3. Depending on the bearing displacement z, a corresponding fluid volume in the first hydraulic cylinder 20 is expelled or absorbed, said fluid volume flowing into the second hydraulic cylinder 40 or flowing out thereof. This brings about a corresponding displacement of the piston 41 of the second hydraulic cylinder 40, which is transmitted to the spring element 12 and can be detected on the basis of the detected spring travel s (z=g(s)). For this purpose, a travel sensor 14 is provided which is designed to detect the change in the spring travel s by sensor. Instead of the spring travel it is also alternatively possible to detect the fluid volume which flows through the hydraulic line 30 owing to the movement of the piston 21 of the first hydraulic cylinder 20.

The measured pressure p and the spring travel s are transmitted to a control device 5 via sensor control lines 15. The control device 5 can be arranged at the spring-damper device 10 or at a distance therefrom. The control device 5 is integrated into the CAN network of the entire vehicle and can receive further control signals via control lines 6, for example a rotational speed signal from the crankshaft and/or acceleration values of the vehicle, for example from the ESP sensor system. On the basis of the received sensor signals 15, the control device 5 calculates an actuator control signal by an algorithm and/or characteristic curves stored therein, said actuator control signal being transmitted via the actuator line 16 to the spring-damper device 10 in order to control the latter by an actuator.

In particular, by the actuator signal it is possible to generate an opposing force in the spring 12 which acts as opposing force at the bearing point 3 in order to counteract motor-side vibrations. For example, vibrations which are generated on the bearing side can be minimized by active generation of counteracting vibrations with the same amplitude but phase-shifted by 180° by a destructive interference. In addition, the spring or damping properties of the spring-damper device 10 can be adapted dynamically by the actuator signal. Spring-damper devices which are formed in this way as a sensor actuator unit are known per se from the prior art and therefore do not have to be described further.

The present spring-damper system therefore permits various operating possibilities depending on how the damping element 11 and the spring element 12 are controlled actively. Various spring-damper characteristics can be generated in order, for example, to re-adjust a desired property of a passive spring-damper system. In particular, it is possible to set the spring-damper system to different ambient conditions, with the result that it is possible to provide and set various spring-damper characteristics for a predetermined number of different basic situations. For example, the damping can be increased greatly when resonant vibrations occur. In contrast, in situations where the vibration of the motor is to be transmitted as little as possible to the frame and the excitation frequency is considerably above the resonant frequency of the system which is capable of vibrating, the damping can be set to as low a value as possible. The spring-damper system can also advantageously be used in the case of an accident in order to alleviate the consequences of the accident. An accident event can be signalled to the control device 5 by, for example, the sensor system for triggering the airbag. The control device 5 can subsequently control the spring-damper device by actuator means in such a way that the damping is maximized at the level of the underlying surface or in all spatial directions in order as a result to convert part of the kinetic energy of the vehicle in the dampers into thermal energy and therefore alleviate the consequences of the accident.

As illustrated in FIG. 1, the present spring-damper system therefore permits the actual spring-loaded and damping elements as well as the actuator system and the sensor system to be spatially separated from the bearing point 3 by transmitting the bearing reactions, with the result that the space required at the actual bearing point can be kept as small as possible. A further advantage is that the actuator system and the sensor system can be encapsulated and arranged in such a way that the moved mass of the vibration system is not increased.

For the sake of better clarity, just one spatial direction is implemented in FIG. 1. The invention is not limited hereto in this context. Further degrees of freedom can be implemented by serial or parallel stacking of a plurality of systems or else only of the bearing parts. This is shown in FIGS. 8A and 8B, which schematically illustrate a transition from the one-dimensional case illustrated in FIGS. 1 to 7 to a two-dimensional case. FIG. 8A shows a bearing point with two serially coupled hydraulic cylinders 20a and 20b in order to movably support the engine 1 on the frame 2 in the x and y directions. The first hydraulic cylinder 20a is attached to the engine 1 and the frame 2, wherein the hydraulic cylinder 20a is guided in a linear guide 7 on the frame in order to be able to carry out a liner movement in the x direction together with the second hydraulic cylinder 20b. Alternatively, the two hydraulic cylinders 20a and 20b can also be coupled parallel to the engine 1 and the frame 2 in order to movably support the engine 1 on the frame 2 in the x and y directions. This is illustrated in FIG. 8B. Here, the end pieces of the hydraulic cylinders 20a and 20b are each attached to the engine 1 and the frame 2 in such a way that they can pivot by means of rotary joints 8, with the result that the bearing point is movable in the x and y directions in the upper rotary joint 8, as illustrated by the arrows. The transition from the two-dimensional case shown to the three-dimensional case can be implemented in analogous fashion to the transition from the one-dimensional case to the two-imensional case.

Further advantageous embodiment variants are described in the following drawings. In order to avoid repetitions, only the particular or additional features of the exemplary embodiments are described below.

Figure 2:
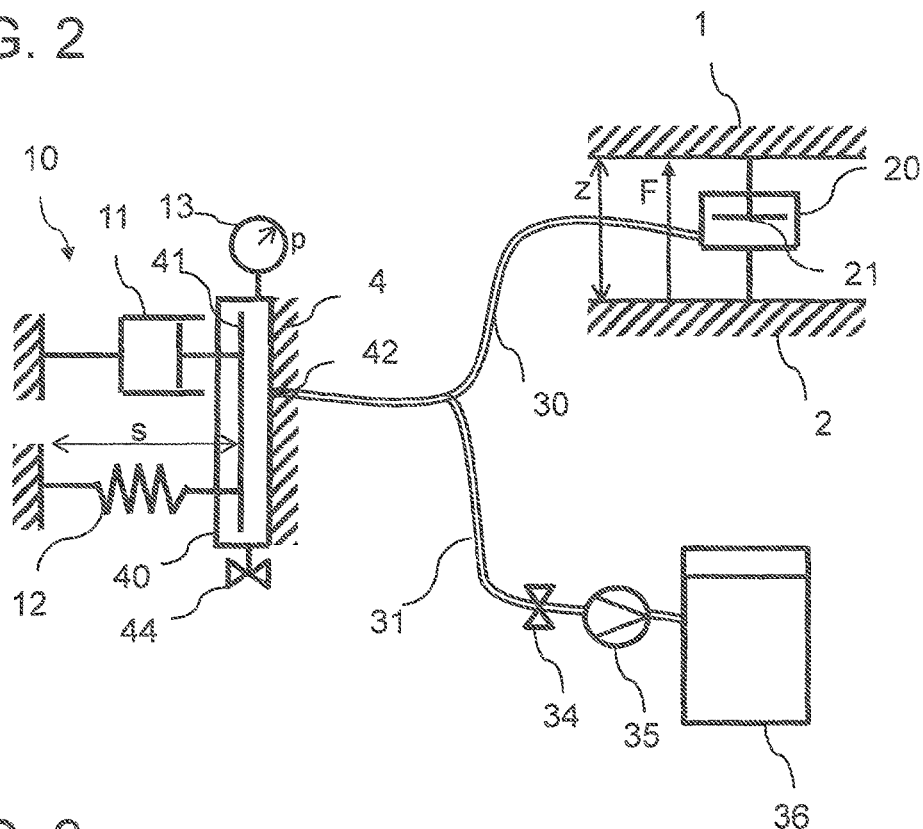
FIG. 2 shows a schematic illustration of a further exemplary embodiment.

According to the exemplary embodiment shown in FIG. 2, a fluid reservoir 36 is provided which is connected via a further fluid line 31 to the first fluid line 30 and can be coupled fluidically to the fluid circuit between the two lifting cylinders 20, 40 via a valve 34 and a fluid pump 35. This permits ride level control at the bearing point. It is therefore possible for example to reduce the distance between the engine 1 and the frame 2 by extracting fluid from the fluid line 30. For this purpose, the valve 34 is opened, with the result that the fluid can flow into the fluid reservoir 36. Conversely, by pumping fluid out of the fluid reservoir 36 into the fluid line 30 it is possible to increase the distance between the engine and the frame to a new desired setpoint level. It is therefore possible for example to lower the centre of gravity of the vehicle when travelling off road and to permit a relatively large vibration range in the case of uneven route profiles by increasing the fluid volume.

Figure 3:
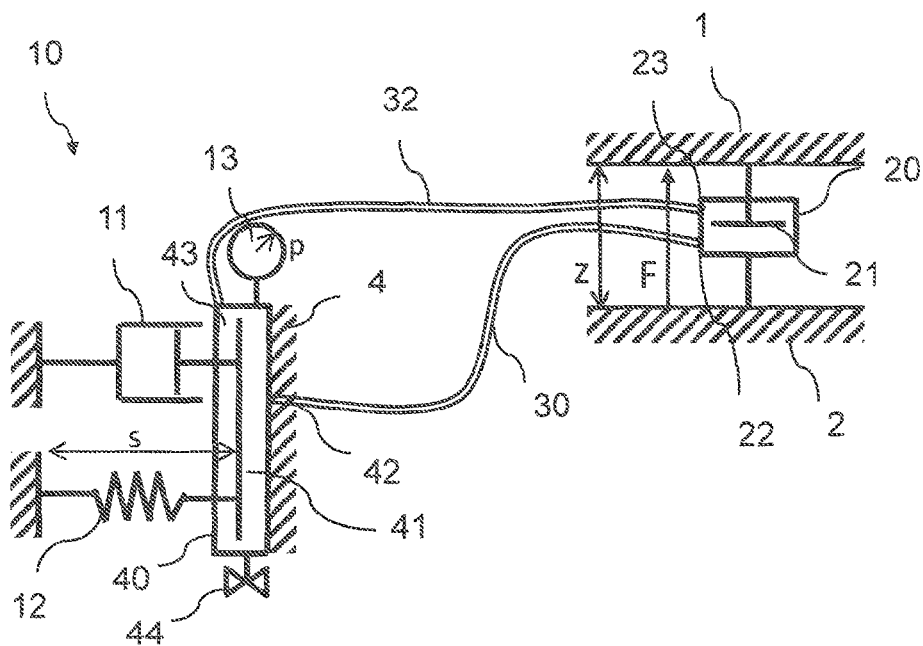
FIG. 3 shows a schematic illustration of a further exemplary embodiment.

According to the exemplary embodiment shown in FIG. 3, in addition to the first fluid line 30 a second fluid line 32 is provided in order to fluidically couple the first hydraulic cylinder 20 to the second hydraulic cylinder 40. In this context, the first fluid line 30 and the second fluid line 32 each open into the hydraulic cylinders 20, 40 on opposite sides of the pistons 21, 41 of the hydraulic cylinders 20, 40, in particular at opposite end regions 22, 23, 42, 43. The provision of the second hydraulic line 32 permits more direct and improved transmission behaviour in order to transmit the bearing reaction from the first hydraulic cylinder 20 to the second hydraulic cylinder 40 and in order to feedback the opposing reaction of the spring-damper device 10 to the first hydraulic cylinder 20.

Figure 4:
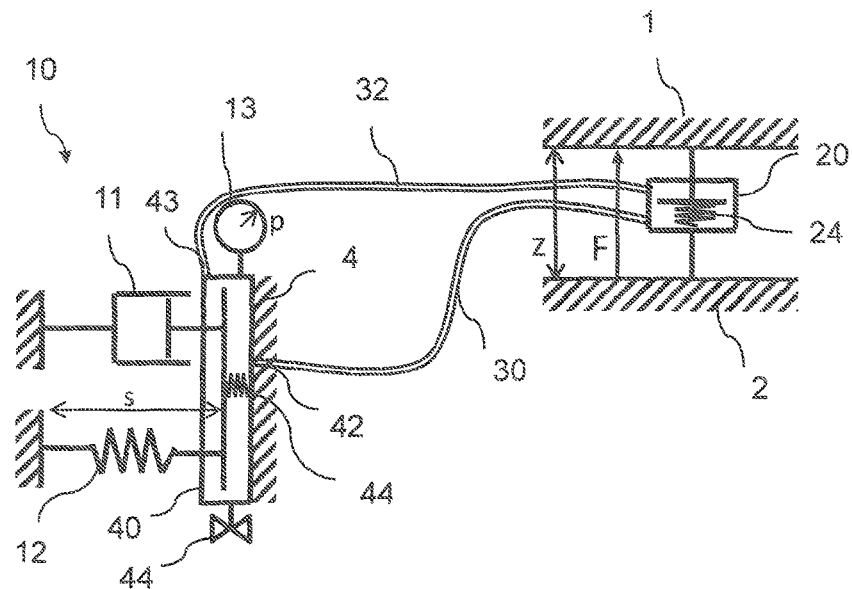
FIG. 4 shows a schematic illustration of a further exemplary embodiment.

According to exemplary embodiment shown in FIG. 4, the hydraulic cylinders 20, 40 are prestressed by spring elements 24, 44 in order, for example, to be able to set a desired position of rest by corresponding selection of the prestress. This also avoids uncontrolled dying away of the power of the engine in the case of a leak in the hydraulic line. Of course, the prestressing of the hydraulic cylinders is also possible without providing the second hydraulic line 32.

Figure 5:
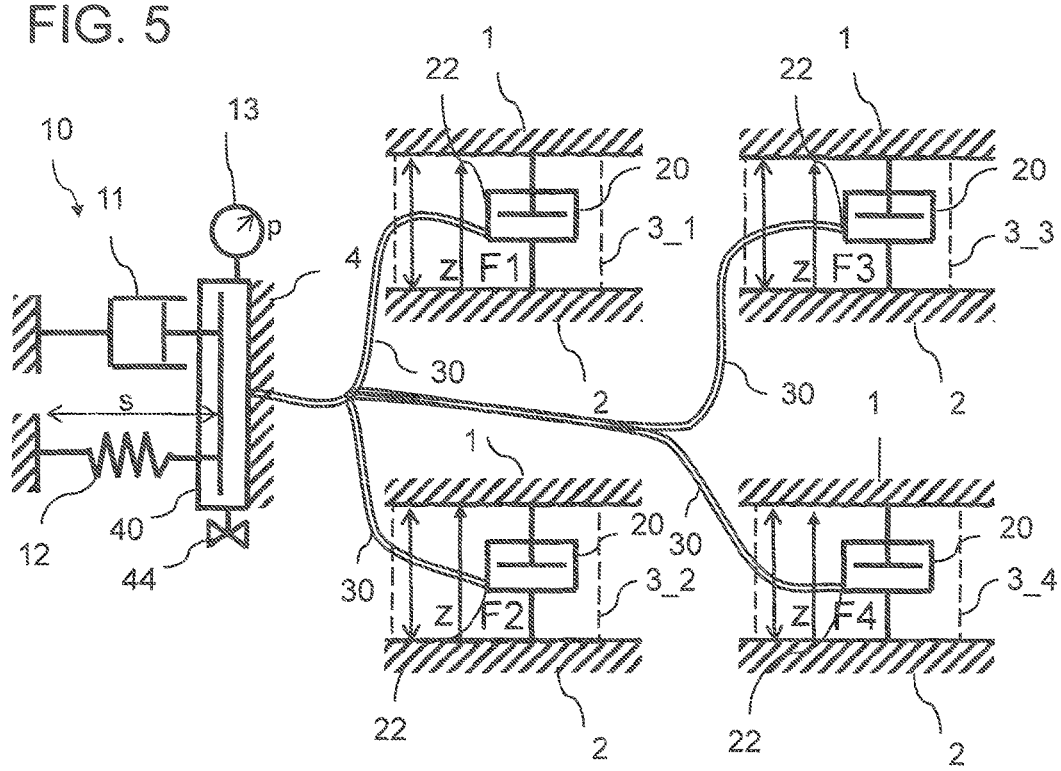
FIG. 5 shows a schematic illustration of a further exemplary embodiment.
Figure 6:
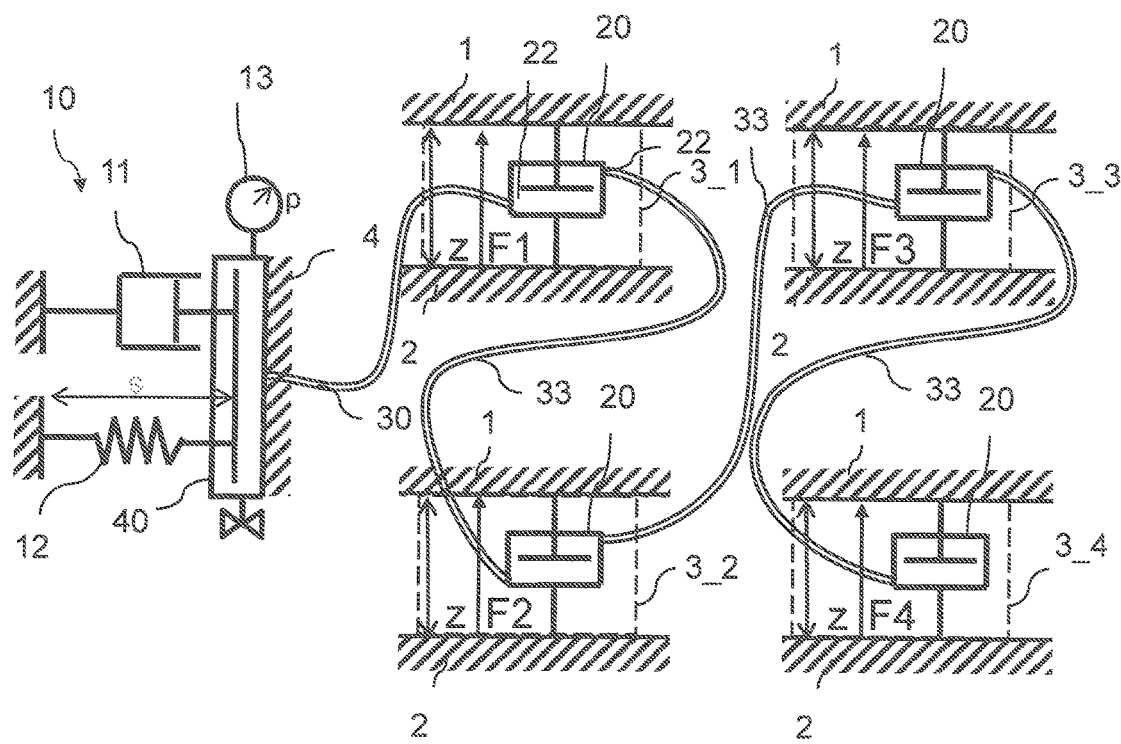
FIG. 6 shows a schematic illustration of a further exemplary embodiment.
Figure 7:
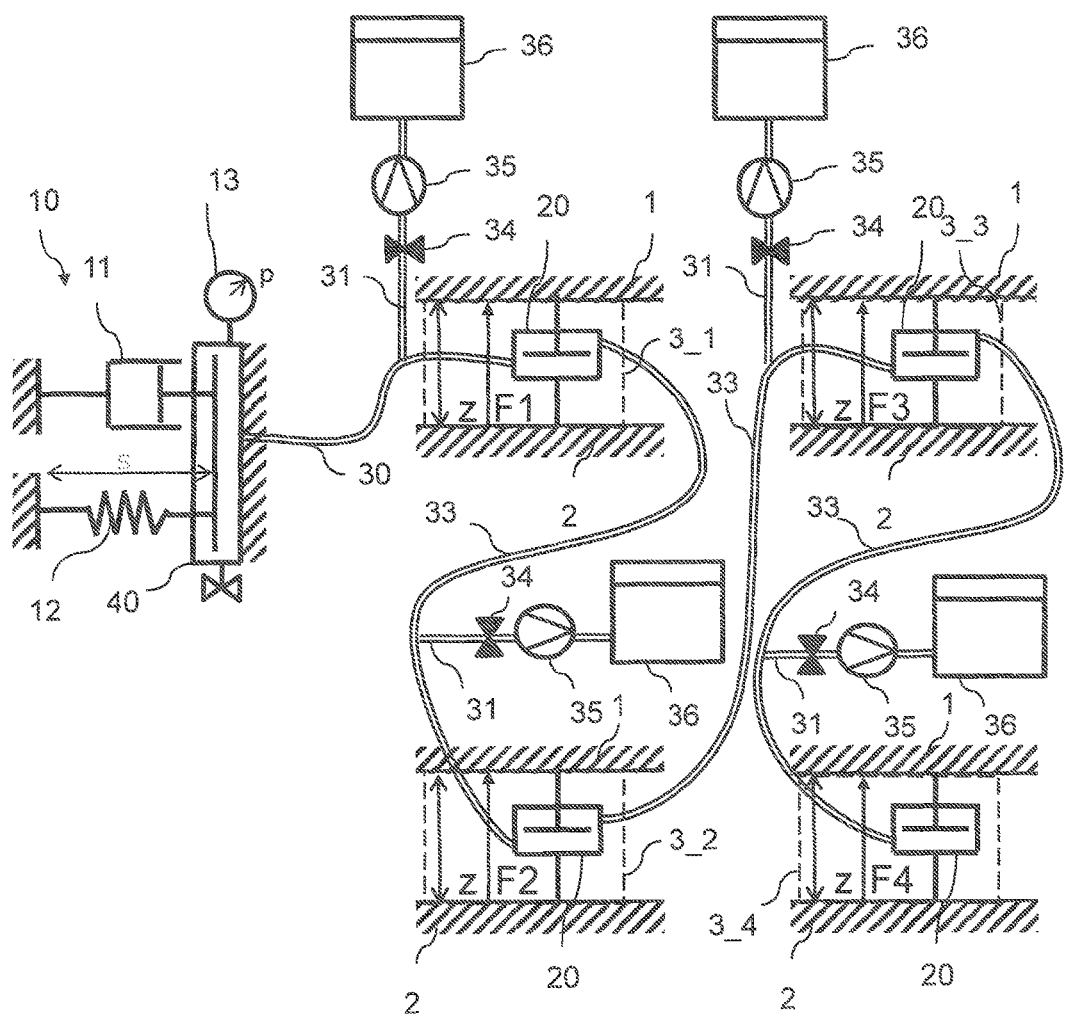
FIG. 7 shows a schematic illustration of a further exemplary embodiment.
Figure 8A:
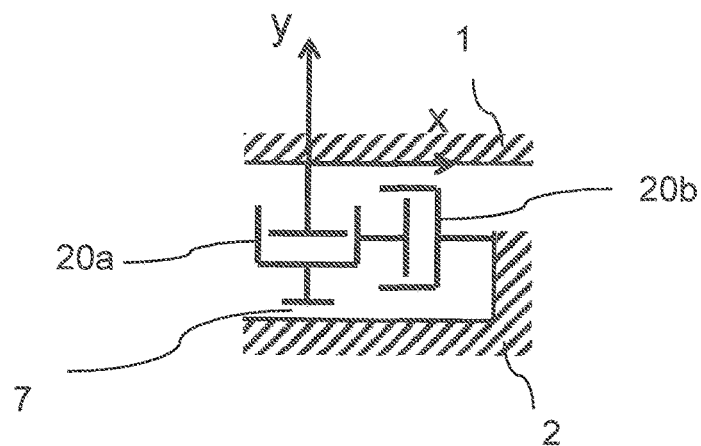
FIG. 8A shows a schematic illustration of a bearing point with a plurality of degrees of freedom according to the embodiment.
Figure 8B:
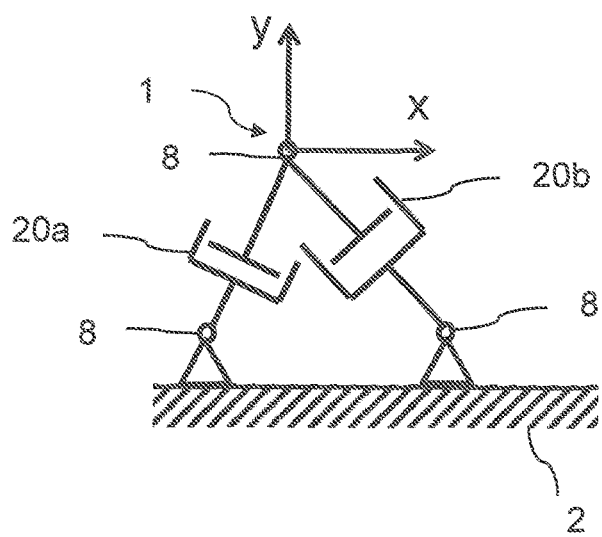
FIG. 8B shows a schematic illustration of a bearing point with a plurality of degrees of freedom according to a further embodiment.

The exemplary embodiments shown in FIGS. 5 to 7 illustrate the particular advantage of the invention according to which a plurality of bearing points can be vibration-damped with just one spring-damper device.

FIG. 5 shows, for example, four bearing points 3_1, 3_2, 3_3 and 3_4 at which the engine 1 is mounted in each case by a hydraulic cylinder 20, as described above, in a vibrating fashion on the frame 2. Each of these first hydraulic cylinders 20 is fluidically connected to the second hydraulic cylinder 40 by means of a hydraulic line 30. As a result of the parallel connection shown the same pressure is present at all the bearing points. The force which is applied is dependent on the piston face A, facing the fluid, of the pistons 21 of the first hydraulic cylinders 20, which may be different from piston to piston. The present arrangement therefore gives rise to a constant ratio of the bearing forces: $F_1/F_2/F_3/F_4=A_1/A_2/A_3/A_4$. This can be used to minimize the bearing forces and to optimize the application force to the vehicle frame for optimum weight distribution.

A refinement of this exemplary embodiment is shown in FIG. 6. Here, the individual bearing points 3_1, 3_2, 3_3 and 3_4 are each connected in series by means of fluid lines 33 which each connect two first hydraulic cylinders 20. In this context, the upper end region of the hydraulic cylinder 20 of the first bearing point 3_1 is connected via a hydraulic line 33 to the lower end region of the hydraulic cylinder 20 of the second bearing point 3_2. The upper end region of the hydraulic cylinder 20 of the second bearing point 3_2 is connected to the lower end region of the hydraulic cylinder 20 of the third bearing point 3_3, and the upper end region of the hydraulic cylinder 20 of the third bearing point 3_3 is connected to the lower end region of the hydraulic cylinder 20 of the fourth bearing point 3_4. This gives rise to a constant ratio of the bearing displacements $z_i$ at the bearings $3\_i : z_1*A_1 = z_2*A_2 = z_3*A_3 = z_4*A_4$ and can be used, for example, for rolling stabilization. With this exemplary embodiment a platform can be mounted in a vibration-damped fashion on a frame such that said platform always moves in parallel with the frame. In order to be able to set a desired angle between the platform and the frame it is also possible, as shown in FIG. 7, to arranged fluid reservoirs 36 at every bearing point in order to adapt the fluid volume at each bearing in such a way that a desired distance is set between the engine 1 and the frame 3.

Although the invention has been described with reference to specific exemplary embodiments, a multiplicity of variants and refinements which also make use of the inventive concept and therefore fall within the scope of protection are possible. It is therefore possible, of course, to combine the various exemplary embodiments with one another. In addition, the spring-damper system according to the invention can be used not only as an engine bearing but also as a chassis damper cab bearing system, for supporting a machine or generally inpassive and active bearings. Consequently, the invention is not intended to be restricted to the disclosed exemplary embodiments but instead the invention is intended to comprise all exemplary embodiments which fall within the scope of the appended patent claims.

LIST OF REFERENCE SYMBOLS

1 Load, in particular engine
2 First supporting unit, in particular engine frame
3 Bearing or damping point
4 Second supporting unit, in particular vehicle body
5 Control device
6 Control line
7 Linear guide
8 Rotary joint
10 Spring-damper device
11 Damper element
12 Spring element
13 Manometer
14 Sensor
15 Sensor control lines
16 Actuator control lines
20, 40 Hydraulic cylinder
21, 41 Piston
22, 42 Lower end region of hydraulic cylinder
23, 43 Upper end region of hydraulic cylinder
30, 31, 32, 33 Hydraulic line
34 Valve
35 Pump
36 Fluid reservoir
44 Overpressure valve
F Bearing force
z Bearing displacement
p Pressure
s Spring travel

The invention claimed is:

1. A spring-damper system for use in bearings or as a damper, comprising:
  a spring-damper device; and
  a coupling device having a first part and a second part, the first part configured to be coupled to a load and to a supporting device at a bearing or damping point to mount the load relative to the supporting device so that the load can vibrate on the supporting device, wherein the first part of the coupling device transmits a load input generated between the load and the supporting device substantially without loss from the bearing point to the second part of the coupling device arranged at the spring-damper device, the first part and the second part are coupled by a first connector element so that a displacement of the first part in response to the load input causes a corresponding displacement of the second part, the corresponding displacement being applied to the spring-damper device to absorb a reaction thereto, and the coupling device feeds said reaction back to the load to counteract the load input to effect a vibration-damping between the load and the supporting device, wherein the spring-damper device is connected to the bearing point only through the coupling device.

2. The spring-damper system according to claim 1, wherein the coupling device configured to be coupled to the load and the supporting device at a plurality of bearing or damping points.

3. The spring-damper system according to claim 1, wherein the spring-damper device is a sensor actuator unit and is configured to detect the transmitted load input and to counteract the transmitted load input by an actuator.

4. The spring-damper system according to claim 1, wherein the spring-damper device:
comprises at least one of a first sensor determining a first control variable dependent on a bearing force of the load input, and a second sensor determining a second control variable dependent on a bearing displacement of the load input, and
is configured to at least one of:
change at least one of the damping properties and the spring properties of the spring-damper device as a function of at least one of the first control variable and the second control variable, and
generate an opposing force to the transmitted load input by an actuator, as a function of at least one of the first control variable and the second control variable.

5. The spring-damper system according to claim 1, wherein the first part is a first fluidic lifting cylinder arranged at the bearing or damping point, the second part is a second fluidic lifting cylinder arranged at the spring-damper device, and the first connector element is a first fluid line, the first fluidic lifting cylinder and the second fluidic lifting cylinder are movably coupled via the first fluid line so that a displacement of the first fluidic lifting cylinder in response to the load input causes a corresponding displacement of the second fluidic lifting cylinder.

6. The spring-damper system according to claim 5, wherein the spring-damper device comprises at least one of a first sensor determining a first control variable dependent on a bearing force of the load input, and a second sensor determining a second control variable dependent on a bearing displacement of the load input, and
wherein at least one of:
the first sensor is a pressure sensor and the spring-damper device is configured to determine, as the first control variable, a fluid pressure in the second lifting cylinder, and
the second sensor detects, as the second control variable, a spring travel of the spring-damper device.

7. The spring-damper system according to claim 5, further comprising a fluid reservoir connectable to a fluid circuit formed by the first fluidic lifting cylinder, the second fluidic lifting cylinder, and the first fluid line for varying the fluid volume in the fluid circuit.

8. The spring-damper system according to claim 5, further comprising a second fluid line via which the first fluidic lifting cylinder and the second fluidic lifting cylinder are movably coupled, wherein the first fluid line and the second fluid line respectively open into the first fluidic lifting cylinder and the second fluidic lifting cylinder on opposite sides of a reciprocating piston in each of the first fluidic lifting cylinder and the second fluidic lifting cylinder.

9. The spring-damper system according to claim 5, wherein at least one of the first fluidic lifting cylinder and the second fluidic lifting cylinder is prestressed.

10. The spring-damper system according to claim 5, wherein the coupling device comprises a plurality of first lifting cylinders configured to be coupled to the load and to the supporting device at various respective bearing or damping points, wherein the plurality of first lifting cylinders are fluidically coupled in a movable fashion to the second lifting cylinder in one of a parallel connection and a series connection.

11. The spring-damper system of claim 10, wherein each respective one of the first lifting cylinders is assigned a separate fluid reservoir for varying the fluid volume in the respective one of the first lifting cylinders.

12. The spring-damper system of claim 1, wherein the spring-damper device includes a spring loaded element and a damping element.

13. The spring-damper system of claim 1, wherein the spring-damper device comprises a dynamically adjustable damping element that operates one of electrorheologically and magnetorheologically.

14. The spring-damper system of claim 1, wherein the spring-damper device includes a spring element with a dynamically adjustable hardness, the spring element comprising one of a mechanical spring with variable prestress and a gas spring with a variable volume or filling quantity.

15. The spring-damper system of claim 1, wherein the spring-damper device comprises a moving coil.

16. The spring-damper system according to claim 5, wherein the lifting cylinders are hydraulic cylinders and contain an incompressible fluid.

17. The spring-damper system according to claim 3, wherein the spring-damper device is embodied as a linear motor controlled as a function of the detected load input such that the linear motor generates elasticity and damping properties which counteract the transmitted load input in response to an actuator.

18. The spring-damper system according to claim 1, wherein one of:
the supporting device is an engine frame and the load is an engine;
the supporting device is a vehicle body and the load is a chassis or a loading device of a vehicle;
the supporting device is a supporting structure for a vehicle seat; or
the supporting device is a structure which is rigid with respect to vibration, and the load is a machine or an assembly device or transportation device.

19. An active vibration-damping bearing with a spring-damper system according to claim 3, the active vibration-damping bearing comprising one of an engine bearing, a chassis bearing, and a machine bearing.

20. The spring-damper system according to claim 5, wherein the spring-damper device comprises a sensor sensing at least one of a displacement of the spring-damper device and a fluid volume that flows through the first fluid line.

* * * * *